(12) United States Patent
Palinkas et al.

(10) Patent No.: US 6,723,771 B2
(45) Date of Patent: Apr. 20, 2004

(54) HIGH FRICTION POLYURETHANE ELASTOMERS HAVING IMPROVED ABRASION RESISTANCE

(75) Inventors: Richard L. Palinkas, Northfield, CT (US); Thomas H. Peter, Southbury, CT (US)

(73) Assignee: Uniroyal Chemical Company, Inc., Middlebury, CT (US)

( * ) Notice: Subject to any disclaimer, the term of this patent is extended or adjusted under 35 U.S.C. 154(b) by 0 days.

(21) Appl. No.: 10/091,209

(22) Filed: Mar. 4, 2002

(65) Prior Publication Data
US 2003/0055192 A1 Mar. 20, 2003

Related U.S. Application Data

(60) Provisional application No. 60/281,820, filed on Apr. 5, 2001.

(51) Int. Cl.[7] .............................. C08K 5/54; C08L 75/04
(52) U.S. Cl. ...................... 524/267; 524/261; 524/266; 524/268; 524/589; 524/590
(58) Field of Search ................................. 524/267, 261, 524/266, 268, 589, 590; 428/423.1, 447; 51/298; 301/5.301

(56) References Cited

U.S. PATENT DOCUMENTS

| | | | |
|---|---|---|---|
| 2,951,053 A | 8/1960 | Rauter et al. | |
| 4,011,189 A | 3/1977 | Keil | 260/33.6 |
| 4,057,595 A | 11/1977 | Rauner et al. | 260/824 |
| 4,343,339 A * | 8/1982 | Schwindt et al. | 152/209.1 |
| 4,524,102 A * | 6/1985 | Hostettler | 428/318.8 |
| 5,605,657 A | 2/1997 | Nybakken et al. | 264/102 |
| 5,674,567 A | 10/1997 | Kausch et al. | |
| 5,844,051 A | 12/1998 | Onzuka et al. | |
| 5,849,052 A | 12/1998 | Barber, Jr. | 51/298 |
| 5,952,444 A | 9/1999 | Ayama | 528/28 |

FOREIGN PATENT DOCUMENTS

GB 806012 10/1962

* cited by examiner

Primary Examiner—Daniel S. Metzmaier
Assistant Examiner—Jeffrey B. Robertson
(74) Attorney, Agent, or Firm—Michael P. Dilworth; Paul Grandinetti

(57) ABSTRACT

A composition of matter is disclosed wherein the composition comprises a polyurethane elastomer prepared by mixing A) a polyurethane prepolymer,
B) a curative, and
C) a liquid, non-reactive polydimethylsiloxane, wherein C) is present in a concentration of about 0.5 to about 25% based on the combined weight of A) plus B), and curing the mixture to form the elastomer.

19 Claims, No Drawings

HIGH FRICTION POLYURETHANE ELASTOMERS HAVING IMPROVED ABRASION RESISTANCE

CROSS REFERENCE TO RELATED APPLICATIONS

We claim the benefit under Title 35, United States Code, §120 of U.S. Provisional Application No. 60/281,820, filed Apr. 5, 2001, entitled HIGH FRICTION POLYURETHANE ELASTOMERS HAVING IMPROVED ABRASION RESISTANCE.

BACKGROUND OF THE INVENTION

1. Field of the Invention

The present invention relates to polyurethane elastomers that are useful in industrial applications, such as railroad side-bearing pads, skate wheels, tires, track pads, friction brakes, scraper blades, and the like. More particularly, the invention relates to polyurethane elastomers having improved abrasion resistance and pressure velocity limits while maintaining their coefficients of friction.

2. Description of Related Art

Polyurethane elastomers are well known, tough materials that are in high demand for a variety of uses. The properties that are most sought after by the users of these materials include superior tear resistance and abrasion resistance.

One method of improving abrasion resistance is to lubricate the surface of the polyurethane that is to be subjected to the abrasive force. The resulting reduction in friction at the surface improves abrasion resistance, since it drastically reduces the energy dissipated there. Surface lubrication can be accomplished by means of external application of a lubricant, or through use of internal lubricants, which are well known in the art. Internal lubricants are generally incompatible materials with lubricating properties that are dispersed as a discontinuous phase in the polyurethane polymer matrix. These lubricants are intended to migrate to the surface either under static or dynamic conditions, or upon the onset of abrasion, by breaking open the tiny droplets of the discontinuous phase.

The mechanism by which these internal lubricants improve abrasion resistance is the same as that of external lubrication. The coefficient of friction is reduced, and the resulting reduction in energy dissipation at the surface has the effect of removing much of the driving force for abrasion. U.S. Pat. No. 4,011,189 discloses urethane compositions that are obtained by curing fluid polyurethane compositions containing incompatible fluids uniformly dispersed therein. Such dispersions are prepared by including in the uncured urethane composition, a specific siloxane-organic copolymer dispersing agent, along with the incompatible fluids. In this patent, a wide range of incompatible fluids are dispersed in a polyurethane elastomer by utilizing a specific siloxane-organic copolymer dispersing agent along with the incompatible fluid. Such systems are said to greatly reduce coefficients of friction and, of course, thereby improve abrasion resistance. Both the incompatible fluid and the dispersing agent formulation may be contributing to the reduction in friction.

While this approach may be beneficial for some applications, such as bearings and bushings, there are many elastomer applications for which it is not acceptable. In tire and wheel applications, for example, reduced traction is often unacceptable. In recreational wheels, such as in-line skate wheels, reduced traction is also unacceptable, since the ability of the skater to accelerate and corner are both highly dependent upon obtaining good traction. In rail car suspensions, polyurethane elastomers are used as side-bearing pads. These side-bearing pads are elastomeric springs that slide across a metal surface, thereby allowing the car to navigate curves in the track. Polyurethanes are used because of their excellent load carrying capabilities, good abrasion resistance, and frictional properties. While improvements in abrasion resistance are desired, any reduction in friction is unacceptable. Maintenance of high friction coefficient is critical to prevent "hunting" of the rail car from side to side.

Many other examples can be cited. Braking mechanisms, of course, require excellent frictional characteristics and abrasion resistance. Track pads for tracked vehicles also require both abrasion resistance and excellent frictional characteristics, to allow the heavy vehicle to climb a smooth surface, even when wet.

It is also important to note that friction reducing additives may lead to inaccurate results in lab abrasion tests by lubricating the abrasive surface. In most lab abrasion tests, such as the Taber test, the same surface comes in contact with the sample over and over again. Once the surface is lubricated, it cannot provide anywhere near the same abrasive force. However, in many actual applications, such as in a belt scraper blade, the urethane is usually in contact with fresh, unlubricated abrasive surfaces and excellent results achieved in the laboratory are generally not realized.

U.S. Pat. No. 4,057,595 discloses a method of modifying the physical properties of urethane elastomers, whereby the properties of the urethane are said to be enhanced. The method involves reacting a specific siloxane-polyoxyalkylene into a urethane elastomer. Specifically, the patentees proposed reactive, primary hydroxy difunctional siloxanes to improve elongation, flexibility, and abrasion resistance of polyurethane elastomers. Since the siloxanes would thus react into the polyurethane matrix, they could not exude to the surface. The patentees disclosed improvements in Taber abrasion resistance in their modified elastomers vs. elastomers without additive. However, in elastomer formulations subject to more aggressive abrasion, it has been found that only mild improvements in abrasion resistance are obtained. In addition, tear strength can be seriously compromised.

U.S. Pat. No. 5,605,657 discloses an industrial solid tire for heavy-load, off-road use having a cast polyurethane tire thereon produced by a batch method. The tire is a heat cured polyurethane produced from a dispersion of a prepolymer, a curative and an amount of a silicone dispersing and lubricant agent. The amount of silicone is between 1.0 and 4.0 parts per hundred of the prepolymer. A method for manufacturing the tire is included. The silicone additive used was Dow Corning Q2-3238, a reactive, dispersible silicone additive. This patent demonstrates the ability of a silicone additive to improve the abrasion resistance of a polyurethane elastomer without the loss of coefficient of friction. The reactive nature of the silicone had apparently bound it to the polyurethane during cure and prevented it from migrating to the surface. However, the viscosity of Q2-3238 is so high that it is a paste and not truly a liquid. Even at elevated temperatures the material is pasty and does not flow. This high viscosity also makes it difficult to disperse in conventional mixing equipment commonly used to make polyurethane prepolymers. In addition, the material is hygroscopic and is not available in a dry form. The presence of moisture is a major problem when working with polyurethanes, since they are moisture reactive, and removal of the moisture in Q2-3238 is difficult, again because of its high viscosity.

In addition, it can be seen from U.S. Pat. No. 5,605,657 that even low levels of Q2-3238, e.g., 1.0–2.0%, caused a loss in split tear resistance. Tear resistance is very important to a wide range of urethane elastomer applications, including industrial tires. Industrial tires carrying heavy loads often run over debris that can cut the tire and reduce its life if tear resistance is insufficient.

U.S. Pat. No. 5,849,052 discloses abrasive articles containing a polysiloxane in their bond system that is said to result in a cutting performance that is maintained or increased while wear is dramatically decreased, resulting in improved abrasive efficiency.

U.S. Pat. No. 5,952,444 discloses:

(1) a polyurethane resin derivative having a polydimethylsiloxane side chain and an isocyanate group in a main chain of a polyurethane molecule which is obtainable by reacting (A) a polydimethylsiloxane having an alkyl group on one terminal and two hydroxyl groups in the vicinity of the other terminal with (B) a polyisocyanate having two or more isocyanate groups in one molecule;

(2) a coating resin composition which is obtainable by reacting a polyurethane resin derivative having a polydimethylsiloxane side chain and an isocyanate group in a main chain of a polyurethane molecule with a hydroxyl group-containing resin; and (3) a method for curing the coating resin composition.

The disclosures of the foregoing are incorporated herein by reference in their entirety.

SUMMARY OF THE INVENTION

It has now been found that non-functional silicone fluids of modest viscosity can be used to make polyurethane elastomers having improved abrasion resistance without reduction of the coefficient of friction. It has further been found that such additives can be incorporated without significant loss of tear strength. Finally, it has been found that such additives can be incorporated without the use of dispersing agents, and that stable, polyurethane prepolymers already containing the additive can be produced via direct addition of the silicone fluid during manufacture of the prepolymer.

More particularly, the present invention is directed to a composition of matter comprising a polyurethane elastomer prepared by mixing A) a polyurethane prepolymer, B) a curative, and C) a liquid, non-reactive polydimethylsiloxane, wherein C) is present in a concentration of about 0.5 to about 25% based on the combined weight of A) plus B), and curing the mixture to form the elastomer.

In another aspect, the present invention is directed to a method for producing a polyurethane elastomer comprising the steps of:

A) mixing:
   1) a polyurethane prepolymer,
   2) a curative, in sufficient amount to cure the polyurethane prepolymer, and
   3) a non-reactive, liquid polydimethylsiloxane,
   wherein 3) is present in a concentration of from about 0.5% to about 25% based on the weight of 1) plus 2), and B) curing the polyurethane prepolymer.

In still another aspect, the present invention is directed to an article of manufacture comprising a polyurethane elastomer and about 0.5% to about 25% based on the weight of the elastomer of a non-reactive, liquid polydimethylsiloxane, whereby the abrasion resistance of the article is improved with no significant loss in friction.

DESCRIPTION OF THE PREFERRED EMBODIMENTS

The silicone employed in the practice of the present invention is a substantially dry, non-reactive silicone or non-reactive silicone oil. It is preferred that the silicone be in a liquid state under ambient conditions. More preferably, these silicones are members of a family of silicone fluids that are commercially available from Wacker Silicones Corporation, 3301 Sutton Road, Adrian, Mich. 49221-9397, under the designation "Silicone Fluids SWS-101". According to the manufacturer, these fluids are stable linear dimethylpolysiloxanes terminated with nonreactive trimethylsiloxy groups that are clear, inert liquids that are available in a number of standard viscosities, have a very high degree of chemical purity, and a narrow uniform molecular weight distribution for each viscosity.

The silicone fluids employed in the practice of the present invention can be of any viscosity (employed here as an indication of chain length) that is effective to improve the abrasion resistance of an article containing them without significantly diminishing the frictional properties of the article. Thus, the viscosity can be as high as 200,000 cst, or higher. Preferably, the viscosity will in the range of from about 5,000 to about 100,000 cst.

The polyurethanes employed in the practice of the present invention can be prepared by the reaction of an organic diisocyanate with a polyol using standard procedures known in the art.

Suitable organic diisocyanates include paraphenylene diisocyanate (PPDI), tolidene diisocyanate (TODI), isophorone diisocyanate (IPDI), 4,4'-methylene bis (phenylisocyanate) (MDI), toluene-2,4-diisocyanate (2,4-TDI), toluene-2,6-diisocyanate (2,6-TDI), naphthalene-1,5-diisocyanate (NDI), diphenyl-4,4'-diisocyanate, dibenzyl-4,4'-diisocyanate, stilbene-4,4'-diisocyanate, benzophenone-4,4'-diisocyanate, 1,3- and 1,4-xylene diisocyanates, 1,6-hexamethylene diisocyanate, 1,3-cyclohexyl diisocyanate, 1,4-cyclohexyl diisocyanate (CHDI), the three geometric isomers of 1,1'-methylene-bis(4-isocyanatocyclohexane) (abbreviated collectively as $H_{12}$ MDI), and mixtures thereof In the preparation of polyurethane and polyurethane/urea elastomers, the diisocyanate monomers are reacted with long chain (high molecular weight) polyols to produce prepolymers containing terminal isocyanate groups that can then be chain extended with short chain (low molecular weight) polyols or aromatic diamines to form polyurethane or polyurethane/urea elastomers. Long chain, high molecular weight polyols, e.g., those having a molecular weight (MW) of above 250, are generally utilized to form the prepolymer and the chain extender is generally a short chain polyol, e.g., $C_2$–$C_{15}$ polyol, or an aromatic diamine. The long chain, high molecular weight polyol provides flexibility and elastomeric properties to the resin, while the short chain polyol or aromatic diamine provides chain extension or cross-links and adds toughness and rigidity to the resulting elastomeric polymer.

High molecular weight polyols, typically polyether polyols, polyester polyols, or hydrocarbon polyols, having a number average molecular weight of at least 250, are often used to prepare the prepolymer. Molecular weights of about 500 to about 6000 are preferred, with molecular weights in the range of about 650 to about 3000 being the most preferred. However, the molecular weight of the high molecular weight polyol may be as high as 10,000 or as low as 250. In addition, low molecular weight glycols and triols, with weights ranging from 60–250, may be included.

Preferred polyalkyleneether polyols may be represented by the general formula HO(RO)$_n$H, wherein R is an alkylene radical and n is an integer large enough that the polyether polyol has a number average molecular weight of at least 250. These polyalkyleneether polyols are well-known components of polyurethane products and can be prepared by the polymerization of cyclic ethers, such as alkylene oxides and glycols, dihydroxyethers, and the like by known methods. Average hydroxyl functionality can range from about 2 to about 8, preferably from about 2 to about 3, and more preferably from about 2 to about 2.5.

The polyester polyols are typically prepared by reaction of dibasic acids (usually adipic acid, but other components such as glutaric, succinic, azelaic, or sebacic acid, or phthalic anhydride, can be present) with diols such as ethylene glycol, 1,2-propylene glycol, 1,4-butylene glycol, 1,6-hexylene glycol, diethylene glycol, polytetramethylene ether glycol and the like. Polyols, such as glycerol, trimethylol propane, pentaerthythritol, sorbitol, and the like may be used if chain branching or ultimate cross-linking is sought. Diesters can be used in place of dibasic acids. Some polyester polyols can also employ caprolactone and dimerized unsaturated fatty acids in their manufacture.

Hydrocarbon polyols can be prepared from ethylenically unsaturated monomers, such as ethylene, isobutylene, and 1,3-butadiene. Examples include polybutadiene polyols Poly-bd R-45 HIT (Atochem) and DIFOL (Amoco Corp.); and KRATON® L polyols (Shell Chemical Co.).

Polycarbonate polyols can also be used and can be prepared by the reaction of glycols (e.g., 1,6-hexylene glycol) with organic carbonates (e.g., diphenyl carbonate, diethyl carbonate, or ethylene carbonate).

The curative, or chain extender, used with the prepolymer can be selected from a wide variety of conventional and well known organic diamine or polyol materials. Preferred materials are either low melting solids or liquids. Specifically preferred are the diamines, polyols, or blends thereof having a melting point below 140° C. These diamines or polyols are generally the ones currently used in the industry as curatives for polyurethane. The selection of a curative is generally based on reactivity needs, property needs for a specific application, process condition needs, and pot life desired. Known catalysts may be used in conjunction with the curative.

Preferred curatives can be selected from aliphatic diols, such as 1,4-butanediol (BDO), hydroquinone-bis-hydroxyethyl ether (HQEE), 1,4-cyclohexane dimethanol (CHDM), aliphatic triols, such as trimethyloipropane and aliphatic tetrols, such as the commercial product QUADROL® (BASF Corp.). Useful aromatic diamines include, for example, 4,4'-methylenedianiline (MDA), 2,2', 5-trichloro-4,4'-methylenediamines naphthalene-1,5-diamine, ortho, meta, and para-phenylene diamines, toluene-2,4-diamine, dichlorobenzidine, and diphenylether-4,4'diamine, including their derivatives and mixtures.

Representative of the most preferred materials are aliphatic diols, such as HIQEE, BDO, and CHDM, and diamines, such as 4,4'-methylene-bis(3-chloroaniline) (MBCA), 4,4'-methylene-bis(3-chloro2,6-diethylaniline) (MCDEA), diethyl toluene diamine (DETDA), tertiary butyl toluene diamine (TBTDA), dimethylthio-toluene diamine ETHACURE® 300 from Albemarle Corporation), trimethylene glycol di-p-amino-beflzoate POLACURE™ 740 from Air Products Corporation), 1,2-bis(2-aminophenylthio) ethane (CYANACURE™ from American Cyanamid Company), methylenedianiline (MDA), and methylenedianiline-sodium chloride complex (CAYTUR® 21 and CAYTUR 31, from Crompton Corporation).

Among the polyurethanes, the two part castable urethane made from polyether-isocyanate or polyester-isocyanate prepolymers cured with organic diamine or polyol materials are most preferred, as represented by ADIPRIENE® and VIBRATHANE® prepolymers (trademarks of Crompton Corporation).

Various features and aspects of the present invention are illustrated further in the examples that follow. While these examples are presented to show one skilled in the art how to operate within the scope of the invention, they are not intended in any way to serve as a limitation upon the scope of the invention.

EXAMPLES

Example 1

VIBRATHANE 8523, a commercially available MDI terminated polyester prepolymer (Crompton Corporation) with 6.9 wt % reactive NCO content was used to evaluate elastomers containing two non-reactive polydimethylsiloxane (PDMS) additives. The additives were Wacker SWS-101-10,000 (W-10) and Wacker SWS-101-60,000 (W-60). The 10,000 and 60,000 refer to the viscosity (cst) of the fluids.

Each additive was added to a container of VIBRATHANE 8523 at a level of 1.3% and mixed in thoroughly. A third container was carried along as a control with VIBRATHANE 8523, but no additive. The three containers were allowed to remain at 158° F (70° C.) overnight (16 hours). Each container was inspected in the morning before elastomer preparation. No evidence of separation or increase in viscosity was found. The mixture was placed in a vacuum chamber and less than 10 millibars of vacuum was applied. No appreciable gas evolution was noted, indicating that the additive had been dry, and that there had been no other source of moisture contamination.

To each container was added sufficient 1,4-butanediol to react with 98% of the available isocyanate. The contents of the containers were mixed thoroughly, and air entrained during mixing was removed with a vacuum chamber and pump. The mixtures were then poured into appropriate test molds in a 240° F. (about 116° C.) oven. After one hour, the test elastomers were removed from the molds, but allowed to remain in the oven overnight (16 hours). Test results are shown below in Table I.

TABLE I

| Test | VIBRATHANE 8523 Control | VIBRATHANE 8523 + 1.3 phr W-10 | VIBRATHANE 8523 + 1.3 phr W-60 |
|---|---|---|---|
| Friction (u) | | | |
| 50 psi load | .73 | .93 | .78 |
| 100 psi load | .86 | .88 | .86 |
| 200 psi load | .89 | 1.11 | 1.04 |
| DIN Abrasion | | | |
| Volume Loss | 46.7 | 10.0 | 13.4 |
| Abrasion Index | 243 | 1133 | 860 |
| Split Tear (D470) | 160 | 160 | 150 |
| Trouser Tear | 250 | 250 | 240 |

Thus, elastomers made with the addition of the non-reactive PDMS fluids had greatly improved abrasion resistance with no loss in tear strength and no loss in coefficient of friction.

Comparative Example A

Two primary hydroxyl-containing reactive siloxane fluids (SILWET® 7230 and SILWET 8620, Crompton Corporation) were tested by the same procedure as in Example 1. One of these, SILWET 7230, caused the prepolymer to rise excessively in viscosity and form some gelled areas, as the result of its high functionality. The other, SLLWET 8620, is difunctional and is thus similar to those disclosed in U.S. Pat. No. 4,057,595. It had little effect on the viscosity, but lowered the % NCO by about 0.25% to about 6.65%. Results for the SILWET 3 8620 are shown below in Table II.

Comparative Example B

Another hydroxy-containing siloxane fluid tested was SILWET 8500, which contains less reactive, secondary hydroxyl groups. This additive was tested at a higher, 3.0%, level, but results were still inferior to those obtained with the non-reactive W-10 and W-60 at a level of only 1.3%. Testing was performed as in Example 1. See Table II below for results:

TABLE II

| Test | VIBRATHANE 8523 + 2.2 phr SILWET 8620 | VIBRATHANE 8523 + 3.0 phr SILWET 8500 |
|---|---|---|
| Friction (u) | | |
| 50 psi load | 1.8 | 1.06 |
| 100 psi load | 1.7 | 0.65 |
| 200 psi load | 1.35 | 1.09 |
| DIN Abrasion | | |
| Volume Loss | 47.9 | 27.8 |
| Abrasion Index | 238 | 408 |
| Split Tear (D470) | 46 | 130 |
| Trouser Tear | 74 | 220 |

Thus, the abrasion resistance in the aggressive DIN abrasion is more modestly improved or not improved at all, and the tear is reduced.

Example 2

The W-10 was tested at higher levels in VIBRATHANE 8523 and in VIBRATHANE 8071, a TDI terminated polyester prepolymer, which was cured with 4,4'-methylenebischloroaniline (MOCA). This testing was performed to determine if tear strength falls off at higher concentrations, as shown in U.S. Pat. No. 5,605,657. The procedure was the same as in Example 1, except that the prepolymers were not left at 158° F overnight prior to casting into elastomers. In addition, the VIBRATHANE 8071 used molds and cure temperatures of 212° F (100° C.) instead of 240° F. The results are shown in Tables III and IV. The control data in Table IV are taken from the manufacturer's data sheet.

TABLE III

VIBRATHANE 8523

| Test | Control No W-10 | 1.5 phr W-10 | 3.0 phr W-10 | 4.5 phr W-10 | 6.0 phr W-10 |
| --- | --- | --- | --- | --- | --- |
| Split Tear | 160 | 150 | 160 | 140 | 140 |
| Trouser Tear | 250 | 300 | 290 | 290 | 290 |

TABLE IV

VIBRATHANE 8071

| Test | Control No W-10 (from data sheet) | 1.5 phr W-10 | 3.0 phr W-10 | 4.5 phr W-10 | 6.0 phr W-10 |
| --- | --- | --- | --- | --- | --- |
| 100% Modulus | 370 | 430 | 440 | 370 | 400 |
| 300% Modulus | 510 | 630 | 660 | 600 | 590 |
| Tensile | 5300 | 6280 | 6180 | 5710 | 5990 |
| Elongation % | 700 | 740 | 750 | 760 | 750 |
| Split Tear | 55 | 73 | 78 | 85 | 78 |
| Trouser Tear | — | 230 | 210 | 200 | 230 |

Example 3

In-Line Skate Brake

An in line skate brake was chosen as an initial application for a field trial of elastomer containing a non-reactive PDMS additive because it is a very aggressive wear application that is always against "new" abrasive surface (asphalt) and because maintenance of frictional characteristics is critical to good performance.

ADIPRENE LF 1 900, a low free TDI polyester prepolymer was used with and without 5 phr of W-10 additive. The prepolymer/W-10 mixture was cured with MOCA in the same manner as that used for VIBRATHANE 8071 in Example 2. The brakes were tested by a skater on downhill braking against a commercial SBR-NR rubber brake. All testing was done on the same day and under the same conditions. The results are shown in Table V.

TABLE V

| | ADIPRENE LF1900 No W-10 | ADIPRENE LF1900 5 phr W-10 | SBR-NR |
| --- | --- | --- | --- |
| Hardness, Shore A | 91 | 90 | 90 |
| Initial Brake Weight | 60.8 gm | 60.0 gm | 70.2 gm |
| Final Brake Weight | 31.8 gm | 52.2 gm | 50.5 gm |
| Loss | 29.0 gm | 7.8 gm | 19.7 gm |
| Abrasion Index | 100 | 366 | 169 |

Thus, a factor of nearly four in abrasion improvement was noted. In addition, no loss of friction was noticed with the modified elastomer.

In view of the many changes and modifications that can be made without departing from principles underlying the invention, reference should be made to the appended claims for an understanding of the scope of the protection afforded the invention.

What is claimed is:

1. A composition of matter comprising a polyurethane elastomer having improved abrasion resistance with no significant loss in friction prepared by mixing A) a polyurethane prepolymer,
B) a curative, and
C) a liquid, non-reactive polydimethylsiloxane,
   wherein C) is present in a concentration of about 0.5 to about 25% based on the combined weight of A) plus B), and curing the mixture to form the elastomer.

2. The composition of claim 1 wherein the polyurethane prepolymer is prepared from a diisocyanate selected from the group consisting of paraphenylene diisocyanate, tolidene diisocyanate, isophorone diisocyanate, 4,4'-methylene bis (phenylisocyanate), toluene-2,4-diisocyanate, toluene-2,6-diisocyanate, naphthalene-1,5-diisocyanate, diphenyl-4,4'-diisocyanate, dibenzyl-4,4'-diisocyanate, stilbene-4,4'-diisocyanate, benzophenone-4,4'-diisocyanate, 1,3-and 1,4-xylene diisocyanates, 1,6-hexamethylene diisocyanate, 1,3-cyclohexyl diisocyanate, 1,4-cyclohexyl diisocyanate, the three geometric isomers of 1,1'-methylene-bis(4-isocyanatocyclohexane), and mixtures of the foregoing.

3. The composition of claim 2 wherein the diisocyanate is reacted with a polyol selected from the group consisting of polyether polyols, polyester polyols, and hydrocarbon polyols, having a number average molecular weight of at least 250.

4. The composition of claim 3 wherein the polyol is a polyalkyleneether polyol represented by the general formula $HO(RO)_nH$, wherein R is an alkylene radical and n is an integer large enough that the polyether polyol has a number average molecular weight of at least 250.

5. The composition of claim 1 wherein the curative is selected from the group consisting of diamines, polyols, and blends thereof having a melting point below 140° C.

6. The composition of claim 5 wherein the curative is selected from the group consisting of 1,4-butanediol, hydroquinone-bis-hydroxyethyl ether, 1,4-cyclohexane dimethanol, trimethylolpropane, aliphatic tetrols, 4,4'-methylenedianiline, 2,2',5-trichloro-4,4'-methylenediamines, naphthalene-1,5-diamine, ortho, meta, and para-phenylene diamines, toluene-2,4-diamine, dichlorobenzidine, diphenylether-4,4'-diamine, 4,4'- methylene-bis(3-chloroaniline), 4,4'-methylene-bis(3-chloro-2,6-diethylaniline), diethyl toluene diamine, tertiary butyl toluene diamine, dimethylthio-toluene diamine, trimethylene glycol di-p-amino-benzoate, 1,2-bis(2-aminophenylthio)ethane, and methylenedianiline-sodium chloride complex, including the derivatives and mixtures of the foregoing.

7. A method for producing a polyurethane elastomer comprising the steps of:

A) mixing:
   1) a polyurethane prepolymer,
   2) a curative, in sufficient amount to cure the polyurethane prepolymer, and
   3) a non-reactive, liquid polydimethylsiloxane, wherein 3) is present in a concentration of from about 0.5% to about 25% based on the weight of 1) plus 2), and B) curing the polyurethane prepolymer to yield an elastomer having improved abrasion resistance with no significant loss in friction.

8. The method of claim 7 wherein the polyurethane prepolymer is prepared from a diisocyanate selected from the group consisting of paraphenylene diisocyanate, tolidene diisocyanate, isophorone diisocyanate, 4,4'-methylene bis(phenylisocyanate), toluene-2,4-diisocyanate, toluene-2,6-diisocyanate, naphthalene-1,5-diisocyanate, diphenyl-4,4'-diisocyanate, dibenzyl-4,4'-diisocyanate, stilbene-4,4'-diisocyanate, benzophenone-4,4'-diisocyanate, 1,3- and 1,4-xylene diisocyanates, 1,6-hexamethylene diisocyanate, 1,3-cyclohexyl diisocyanate, 1,4-cyclohexyl diisocyanate, the three geometric isomers of 1,1'-methylene-bis(4-isocyanatocyclohexane), and mixtures of the foregoing.

9. The method of claim 8 wherein the diisocyanate is reacted with a polyol selected from the group consisting of polyether polyols, polyester polyols, and hydrocarbon polyols, having a number average molecular weight of at least 250.

10. The method of claim 9 wherein the polyol is a polyalkyleneether polyol represented by the general formula HO(RO)$_n$H, wherein R is an alkylene radical and n is an integer large enough that the polyether polyol has a number average molecular weight of at least 250.

11. The method of claim 7 wherein the curative is selected from the group consisting of diamines, polyols, and blends thereof having a melting point below 140° C.

12. The method of claim 11 wherein the curative is selected from the group consisting of 1,4-butanediol, hydroquinone-bis-hydroxyethyl ether, 1,4-cyclohexane dimethanol, trimethylolpropane, aliphatic tetrols, 4,4'-methylenedianiline, 2,2',5-tricbloro-4,4'-methylenediamines, naphthalene-1,5-diamine, ortho, meta, and para-phenylene diamines, toluene-2,4-diamine, dichlorobenzidine, diphenylether-4,4'-diamine, 4,4'-methylene-bis(3-chloroaniline), 4,4'-methylene-bis(3-chioro-2,6-diethylaniline) diethyl toluene diamine, tertiary butyl toluene diamine, dimethylthio-toluene diamine, trimethylene glycol di-p-amino-benzoate, 1,2-bis(2-aminophenylthio)ethane and methylenedianiline-sodium chloride complex, including the derivatives and mixtures of the foregoing.

13. An article of manufacture comprising a polyurethane elastomer and about 0.5% to about 25% based on the weight of the elastomer of a non-reactive, liquid polydimethylsiloxane, whereby the abrasion resistance of the article is improved with no significant loss in friction.

14. The article of manufacture of claim 13 wherein the article is a railroad side bearing pad.

15. The article of manufacture of claim 13 wherein the article is a skate wheel.

16. The article of manufacture of claim 13 wherein the article is a tire.

17. The article of manufacture of claim 13 wherein the article is a track pad.

18. The article of manufacture of claim 13 wherein the article is an elastomeric friction brake.

19. The article of manufacture of claim 13 wherein the article is a scraper blade.

* * * * *